Oct. 19, 1954

A. J. LEWUS 2,692,362

CONTROL CIRCUITS FOR INDUCTION MOTORS

Filed July 23, 1953

INVENTOR.
Alexander J. Lewus
BY
Smith, Olsen, Baird & Gulbrandsen
Attys.

Oct. 19, 1954    A. J. LEWUS    2,692,362
CONTROL CIRCUITS FOR INDUCTION MOTORS
Filed July 23, 1953    2 Sheets-Sheet 2
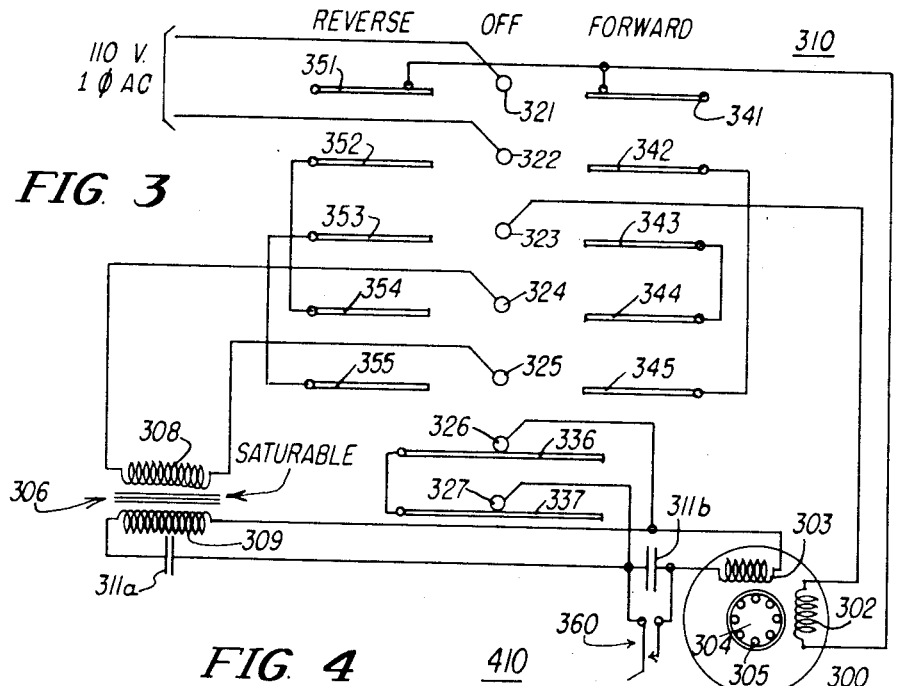
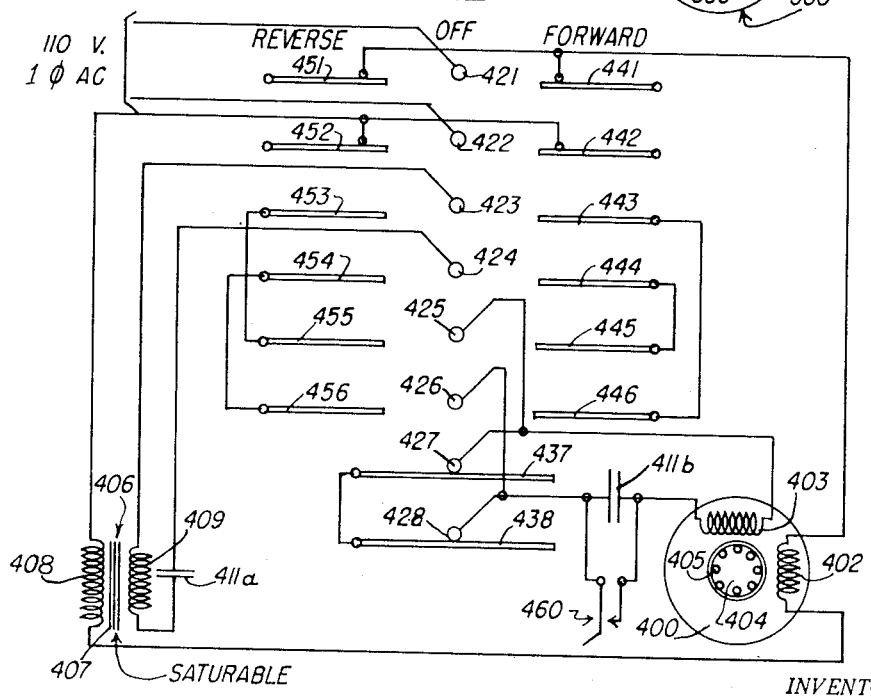
INVENTOR.
Alexander J. Lewus
BY
Smith, Olsen, Baird & Gulbrandsen
Attys.

Patented Oct. 19, 1954

2,692,362

UNITED STATES PATENT OFFICE 2,692,362

CONTROL CIRCUITS FOR INDUCTION MOTORS

Alexander J. Lewus, Cicero, Ill.

Application July 23, 1953, Serial No. 369,853

14 Claims. (Cl. 318—203)

The present invention relates to control circuits for induction motors and more particularly to such circuits for induction motors of the capacitor type disclosed in the copending application of Alexander J. Lewus, Serial No. 360,798, filed June 10, 1953.

It is the general object of the present invention to provide in a circuit of the character noted, a circuit controller or switch that is selectively operative between an off position and forward and reverse positions for the purpose of selectively starting and running the rotor of the associated induction motor in the respective forward and reverse directions, wherein the switch is arranged to disconnect the windings of the motor from the associated source of power supply when it is returned from either its forward position or its reverse position back into its off position.

Another object of the invention is to provide a circuit controller or switch in a circuit of the character noted, wherein the switch is also arranged to complete a dynamic braking circuit for the rotor when the switch is returned from either its forward position or its reverse position back into its off position so that the direction of rotation of the motor may be instantly reversed.

A further object of the invention is to provide a circuit controller or switch in a circuit of the character noted, wherein the forward and reverse positions of the switch comprise final positions disposed on the opposite sides of the intermediate off position thereof, so that the rotor is stopped instantly and reversed instantly when the switch is quickly operated from one of its final positions to the other of its final positions through its intermediate position.

A further object of the invention is to provide a circuit controller or switch for starting and running and braking the reversible rotor of an induction motor of the single-phase split-phase type, including a stator provided with angularly displaced main and auxiliary windings, wherein the auxiliary winding and an associated capacitor are employed for starting the rotor in either direction, and wherein the auxiliary winding and at least a portion of the associated capacitor are employed for braking the rotor when the switch is returned from either its forward position or its reverse position back into its off position.

A still further object of the invention is to provide a starting and running and braking control circuit for the reversible rotor of an induction motor of the single-phase split-phase type, including a stator provided with angularly displaced main and auxiliary windings, wherein the circuit includes a circuit controller or switch having an off position and forward and reverse positions, as well as a transformer provided with a core having primary and secondary windings, wherein the switch in its forward and reverse positions completes a first circuit for energizing in series relation the main winding and the primary winding, while a second circuit is completed for energizing in series relation the auxiliary winding and the secondary winding via an associated capacitor, and wherein the switch in its respective forward and reverse positions effects corresponding poling of the elements included in one of the first and second circuits for starting and running of the rotor in the corresponding directions.

Further features of the invention pertain to the particular connection and arrangement of the elements of the electric motor and of the transformer and of the circuit controller or switch, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 3 is a diagrammatic illustration of a starting-running-braking control circuit for an induction motor of the type noted; and Fig. 4 is a diagrammatic illustration of a modified form of the control circuit of Fig. 3.

Figure 1:
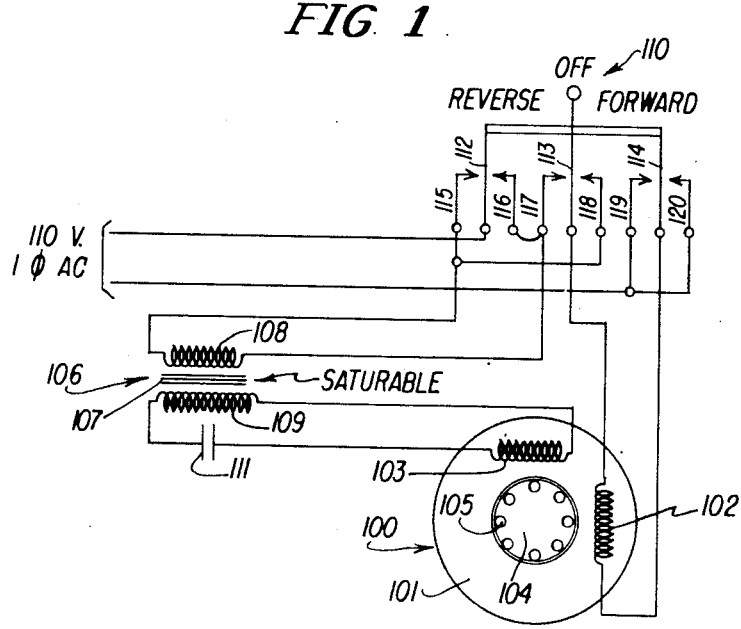
Figure 1 is a diagrammatic illustration of a starting-running control circuit for a single-phase split-phase induction motor of the capacitor type and embodying the present invention.

Referring now to Fig. 1 of the drawings, there is illustrated a starting-running control circuit embodying the features of the present invention and comprising an electric motor 100 of the single-phase split-phase induction type including a stator 101 provided with angularly displaced main and auxiliary windings 102 and 103, and a reversible rotor 104 provided with a squirrel-cage winding 105. Also the control circuit includes a transformer 106 provided with a saturable magnetic core 107 carrying primary and secondary windings 108 and 109. Further, the circuit comprises a circuit controller or switch 110 having an intermediate off position and forward and reverse positions disposed on opposite sides of the off position. Finally, the circuit comprises a capacitor 111, that is preferably of the dry electrolytic type, and a source of current supply of 110 volts single-phase A. C. In the arrangement, the switch 110 includes three movable blades 112, 113 and 114 cooperating with corresponding pairs of stationary contacts 115—116, 117—118 and 119—120, the contacts 115, 117 and 119 constituting reverse contacts and the contacts 116, 118 and 120 constituting forward contacts. Of course, the switch 110 may be operated either manually or automatically in a conventional manner.

Considering now the operation of the motor 100, when the switch 110 occupies its off position, the main and auxiliary windings 102 and 103, as well as the primary and secondary windings 108 and 109, are deenergized.

When the switch 110 is operated into its forward position, the blades 112, 113 and 114 complete, at the respective forward contacts 116, 118 and 120, a first circuit for energizing in series relation the primary winding 108 and the main winding 102 across the source of current supply. Also at this time a second or local circuit is completed for energizing in series relation the secondary winding 109 and the auxiliary winding 103 via the capacitor 111. Further, at this time the primary winding 108 and the main winding 102 are poled with respect to each other in the forward direction so that the relatively heavy starting currents respectively traversing the main winding 102 and the auxiliary winding 103 effect starting of the rotor 104 in the forward direction, the capacitor 111 effecting the necessary phase-shift between the starting currents respectively traversing the main and auxiliary windings 102 and 103. Hence the rotor 104 is accelerated in the forward direction and ultimately rotates at its normal running speed somewhat below the synchronous speed. During normal forward running of the rotor 104, the current traversing the main winding 102 is modest and the current traversing the auxiliary winding 103 is exceedingly small; whereby it is unnecessary to open the local circuit, including the secondary winding 109, the auxiliary winding 103 and the capacitor 111.

On the other hand, when the switch 110 is operated into its reverse position, the blades 112, 113 and 114 complete, at the respective reverse contacts 115, 117 and 119, the first circuit for energizing in series relation the primary winding 108 and the main winding 102 across the source of current supply. Also at this time the second or local circuit is completed for energizing in series relation the secondary winding 109 and the auxiliary winding 103 via the capacitor 111. Further, at this time the primary winding 108 and the main winding 102 are poled with respect to each other in the reverse direction so that the relatively heavy starting currents respectively traversing the main winding 102 and the auxiliary winding 103 effect starting of the rotor 104 in the reverse direction, the capacitor 111 effecting the necessary phase-shift between the starting currents respectively traversing the main and auxiliary windings 102 and 103. Hence the rotor 104 is accelerated in the reverse direction and ultimately rotates at its normal running speed somewhat below the synchronous speed. During normal reverse running of the rotor 104, the current traversing the main winding 102 is modest and the current traversing the auxiliary winding 103 is exceedingly small; whereby it is unnecessary to open the local circuit, including the secondary winding 109, the auxiliary winding 103 and the capacitor 111.

In connection with the poling of the primary winding 108 and the main winding 102 with respect to each other in the corresponding forward and reverse positions of the switch 110, it is noted that the terminals of the primary winding 108 are actually reversed; however, alternatively the terminals of the main winding 102 may be reversed in order to effect reversal of the relative poling of the main winding 102 and the primary winding 108 in an obvious manner.

Considering now in greater detail the construction and arrangement of the motor 100 and the transformer 106, the motor 100 may be of the fractional horsepower type or may have a rating as high as about 10 hp., and the magnetic core 107 of the transformer 106 is of the saturable type. In the illustrated embodiment, the motor 100 has a rating of one hp.; whereby the main winding 102 comprises 400 turns; the auxiliary winding 103 comprises 110 turns; the primary winding 108 comprises 84 turns; and the secondary winding 109 comprises 233 turns. Accordingly, the starting and running impedances of the main winding 102 are respectively low and high with respect to each other so that the magnetic core 107 is respectively saturated and unsaturated by the respective starting and running currents traversing the primary winding 108; whereby the starting and running currents traversing the primary winding 108 respectively induce peaked starting and substantially sinusoidal running voltages in the secondary winding 109. The starting and running voltages induced in the secondary winding 109 are harmonically distorted and are respectively high and low with respect to each other, and the starting and running impedances of the auxiliary winding 103 are respectively low and high with respect to each other, so that the starting and running currents traversing the auxiliary winding 103, are respectively high and low with respect to each other. The starting current traversing the primary winding 108 maintains saturated the magnetic core 107 from standstill to at least 50% of the normal running speed of the rotor 104, the rotor 104 having a normal running speed at full load of about 1735 R. P. M. and a synchronous speed of 1800 R. P. M.

More particularly, from standstill to about 50% of the normal running speed of the rotor 104, the rotor 104 develops at least 150% normal torque, the starting torque increasing rapidly from this speed to approximately 275% normal torque at 67% of the normal running speed thereof, and then decreasing gradually to 100% normal torque at the normal running speed thereof. The capacitor 111 has a relatively small capacitance (about 230 microfarad) and a relatively high voltage rating (about 200 volts). The second or local circuit, including the auxiliary winding 103, the secondary winding 109 and the capacitor 111, is substantially series resonant during saturation of the magnetic core 107 so that the capacitor 111 effects substantially dephasing of the starting current traversing the auxiliary winding 103 with respect to the starting current traversing the main winding 102 in order to produce a substantial starting torque between the stator 101 and the rotor 104, as described above. When the rotor 104 is rotated at its normal full load running speed of about 1735 R. P. M. the voltage induced in the auxiliary winding 103 from the main winding 102 is in opposition to the voltage induced in the secondary winding 109 from the primary winding 108; whereby there is substantially no resulting voltage in the second or local circuit so that the current traversing the capacitor 111 is exceedingly small.

Figure 2:
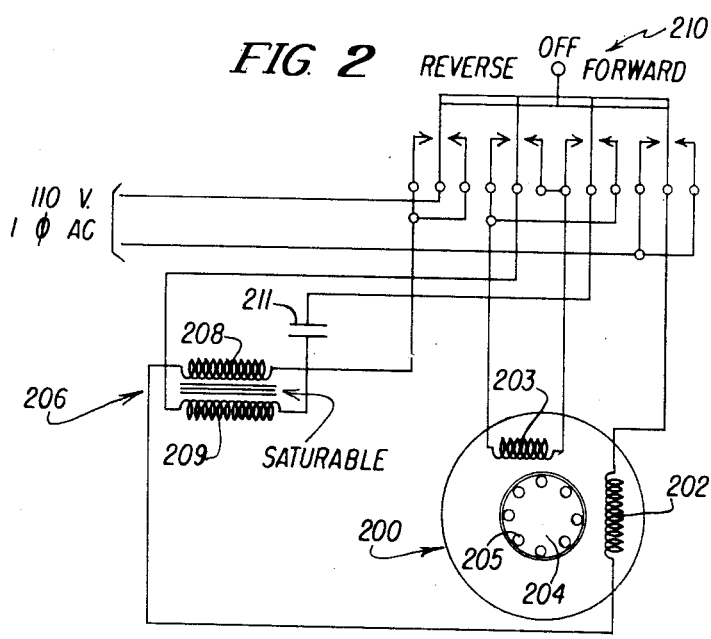
Fig. 2 is a diagrammatic illustration of a modified form of the control circuit of Fig. 1.

Referring now to Fig. 2, a modified form of the control circuit is illustrated that includes corresponding elements, including the motor 200, the transformer 206, the circuit controller or switch 210 and the capacitor 211, the motor 200 including the main and auxiliary windings 202 and 203, as well as the rotor 204 carrying the squirrel-cage winding 205, the transformer 206 including the primary and secondary windings 208 and 209. In this arrangement, the switch 210 is provided with an intermediate off position and forward and reverse positions disposed on opposite sides of the off position. Further, the switch 210 comprises four blades provided with cooperating pairs of contacts arranged in forward and reverse groups.

The operation of the motor 200 is generally the same as that of the motor described above; however, in this case, the switch 210 effects relative poling between the auxiliary winding 203 and the secondary winding 209, the terminals of the auxiliary winding 203 being reversed incident to operation of the switch 210 between its forward and reverse positions. It is noted that the relative poling of the auxiliary winding 203 and the secondary winding 209 with respect to each other may alternatively be achieved by reversing the terminals of the secondary winding 209 incident to operation of the switch 210 between its forward and reverse positions.

In any case, the rotor 204 is started and run in its respective forward and reverse directions in response to operation of the switch 210 into its respective forward and reverse positions; the circuit conditions incident to starting and running of the motor 200 being identical to those described above in conjunction with the motor 100.

Referring now to Fig. 3, a further modified form of the control circuit is illustrated that generally corresponds to Fig. 1 and that includes the motor 300, the transformer 306, the circuit controller or switch 310, and the capacitor 311a—311b, the motor 300 including the main and auxiliary windings 302 and 303, as well as the rotor 304 carrying the squirrel-cage winding 305, and the transformer 306 including the saturable magnetic core 307 carrying the primary and secondary windings 308 and 309. In this arrangement the switch 310 is in the form of a drum controller having an intermediate off position and forward and reverse positions disposed on opposite sides of the off position. Specifically, the drum controller 310 includes a set of seven stationary contacts 321 to 327, inclusive; a set of two off contacts or slides 336 and 337; a set of five forward contacts or slides 341 to 345, inclusive; and a set of five reverse contacts or slides 351 to 355, inclusive.

In the arrangement of the drum controller 310, the stationary contacts 321 to 325, inclusive, respectively engage the forward contacts 341 to 345, inclusive, when the drum is rotated into its forward position, and the stationary contacts 321 to 325, inclusive, respectively engage the reverse contacts 351 to 355, inclusive, when the drum is rotated into its reverse position. Finally, the stationary contacts 326 to 327 engage the off contacts 336 and 337 when the drum is rotated into its off position and during a small overlap arc of its respective forward and reverse positions. In other words, when the drum is rotated from its off position into its forward position, the stationatry contacts 321 to 325, inclusive, engage the respective forward contacts 341 to 345, inclusive, shortly before the stationary contacts 326 and 327 respectively disengage the off contacts 336 and 337; and a reverse operation takes place when the drum is rotated from its forward position back into its off position. Similarly when the drum is rotated from its off position into its reverse position, the stationary contacts 321 to 325, inclusive, engage the respective reverse contacts 351 to 355, inclusive, shortly before the stationary contacts 326 and 327 respectively disengage the off contacts 336 and 337; and a reverse operation takes place when the drum is rotated from its reverse position back into its off position.

It is noted that the capacitor is divided into two sections 311a and 311b, and that a control switch 360 is provided that may be selectively operated to short-circuit the section 311b of the capacitor, for a purpose more fully explained hereinafter.

The control circuit of Fig. 3 corresponds generally to that of Fig. 1, as previously noted, but this control circuit also embodies an arrangement for dynamically braking the rotor 304 of the motor 300 incident to the return of the drum controller 310 from either its forward position or its reverse position back into its off position. Specifically, when the drum controller 310 is operated from its off position into its forward position, the rotor 304 of the motor 300 starts and then runs in the forward direction, the primary winding 308 of the transformer 306 being poled for the forward starting by virtue of the cooperation between the stationary contacts 324 and 325 and the respectively engaged forward contacts 344 and 345. Subsequently, when the drum controller 310 is returned from its forward position back into its off position, the stationary contacts 326 and 327 respectively engage the off contacts 336 and 337 during a short arc of the return movement while the stationary contacts 321 to 325, inclusive, respectively engage the forward contacts 341 to 345, inclusive. Accordingly, the auxiliary winding 303 is short-circuited during this short time interval, while the main winding 302 is energized; whereby the rotor 304 is dynamically braked, the rotation thereof being arrested substantially instantly. The path for short-circuiting the auxiliary winding 303 includes the stationary contacts 326 and 327 and the respectively engaged off contacts 336 and 337; and may include or exclude the section 311b of the capacitor, depending upon the position of the control switch 360. Normally, the inclusion of the section 311b of the capacitor in the path for short-circuiting the auxiliary winding 303, when the control switch 360 occupies its open position, effects a reduction in the braking rate of the rotor 304. Also in passing, it is noted that a multiple path is completed for short-circuiting the secondary winding 309 that includes the section 311a of the capacitor; whereby the secondary winding 309 is protected against unduly heavy short-circuit currents prior to the operation of the drum controller 310 into its off position to interrupt the first circuit for energizing in series relation the primary winding 308 and the main winding 302.

Similarly, when the drum controller 310 is operated from its off position into its reverse position the rotor 304 of the motor 300 starts and then runs in the reverse direction, the primary winding 308 of the transformer 306 being poled for the reverse starting by virtue of the cooperation between the stationary contacts 324 and 325 and the respectively engaged reverse contacts 354 and 355. Subsequently when the drum controller 310 is returned from its reverse position back into its off position, the stationary contacts 326 and 327 respectively engage the off contacts 336 and 337 during a short arc of the return movement, while the stationary contacts 321 to 325, inclusive, respectively engage the reverse contacts 351 to 355, inclusive. Accordingly, the auxiliary winding 303 is short-circuited during this short time interval while the main winding 302 is energized; whereby the rotor 304 is dynamically braked, the rotation thereof being arrested substantially instantly. The path for short-circuiting the auxiliary winding 303 and the multiple path for short-circuiting the secondary winding 309 are the same as described above; and the braking rate of the rotor 304 again depends upon the position of the control switch 360.

In conjunction with the control circuit of Fig. 3, it is noted that the reverse poling of the primary winding 308 with respect to the main winding 302 is achieved by reversing the terminals of the primary winding 308, but that alternatively this effect may be obtained by reversing the terminals of the main winding 302.

In view of the above description, it will be understood that the drum controller 310 may be quickly operated from either of its extreme positions through its off position into the other of its extreme positions so as to effect reversal of the direction of rotation of the rotor 304 with dynamic braking therebetween; whereby the drum controller 310 may be quickly or instantly operated between its extreme positions without any danger of damage to the motor 300 and so as to obtain the required reversal of the direction of rotation of the rotor 304.

Referring now to Fig. 4, a further modified form of the control circuit is illustrated that generally corresponds to Fig. 2 and that includes the motor 400, the transformer 406, the circuit controller or switch 410, and the capacitor 411a—411b, the motor 400 including the main and auxiliary winding 402 and 403, as well as the rotor 404 carrying the squirrel-cage winding 405, and the transformer 406 including the saturable magnetic core 407 carrying the primary and secondary windings 408 and 409. In this arrangement, the switch 410 is in the form of a drum controller having an intermediate off position and forward and reverse positions disposed on opposite sides of the off position. Specifically, the drum controller 410 includes a set of eight stationary contacts 421 to 428, inclusive; a set of two off contacts or slides 437 and 438; a set of six forward contacts or slides 441 to 446, inclusive; and a set of six reverse contacts or slides 451 to 456, inclusive.

In the arrangement of the drum controller 410, the stationary contacts 421 to 426, inclusive, respectively engage the forward contacts 441 to 446, inclusive, when the drum is rotated into its forward position, and the stationary contacts 421 to 426, inclusive, respectively engage the reverse contacts 451 to 456, inclusive, when the drum is rotated into its reverse position. Finally, the stationary contacts 427 and 428 engage the off contacts 437 and 438 when the drum is rotated into its off position and during a small overlap arc of its respective forward and reverse positions. In other words, when the drum is rotated from its off position into its forward position, the stationary contacts 421 to 426, inclusive, engage the respective forward contacts 441 to 446, inclusive, shortly before the stationary contacts 427 and 428 respectively disengage the off contacts 437 and 438; and a reverse operation takes place when the drum is rotated from its forward position back into its off position. Similarly, when the drum is rotated from its off position into its reverse position the stationary contacts 421 to 426, inclusive, engage the respective reverse contacts 451 to 456, inclusive, shortly before the stationary contacts 427 and 428 respectively disengage the off contacts 437 and 438; and a reverse operation takes place when the drum is rotated from its reverse position back into its off position.

It is noted that the capacitor is divided into two sections 411a and 411b, and that a control switch 460 is provided that may be selectively operated to short-circuit the section 411b of the capacitor, for a purpose more fully explained hereinafter.

The control circuit of Fig. 4 corresponds generally to that of Fig. 2, as previously noted, but this control circuit also embodies an arrangement for dynamically braking the rotor 404 of the motor 400 incident to the return of the drum controller 410 from either its forward position or its reverse position back into its off position. Specifically, when the drum controller 410 is operated from its off position into its forward position, the rotor 404 of the motor 400 starts and then runs in the forward direction, the auxiliary winding 403 of the motor 400 being poled for the forward starting by virtue of the cooperation between the stationary contacts 425 and 426 and the respectively engaged forward contacts 445 and 446. Subsequently when the drum controller 410 is returned from its forward position back into its off position, the stationary contacts 427 and 428 respectively engage the off contacts 437 and 438 during a short arc of the return movement while the stationary contacts 421 to 426, inclusive, respectively engage the forward contacts 441 to 446, inclusive. Accordingly, the auxiliary winding 403 is short-circuited during this short time interval, while the main winding 402 is energized; whereby the rotor 404 is dynamically braked, the rotation thereof being arrested substantially instantly. The path for short-circuiting the auxiliary winding 403 includes the stationary contacts 427 and 428 and the respectively engaged off contacts 437 and 438; and may include or exclude the section 411b of the capacitor, depending upon the position of the control switch 460. Normally, the inclusion of the section 411b of the capacitor in the path for short-circuiting the auxiliary winding 403, when the control switch 460 occupies its open position, effects a reduction in the braking rate of the rotor 404. Also, in passing, it is noted that a multiple path is completed for short-circuiting the secondary winding 409 that includes the section 411a of the capacitor; whereby the secondary winding 409 is protected against unduly heavy short-circuiting currents prior to the operation of the drum controller 410 into its off position to interrupt the first circuit for energizing in series relation the primary winding 408 and the main winding 402.

Similarly, when the drum controller 410 is operated from its off position into its reverse position, the rotor 404 of the motor 400 starts and then runs in the reverse direction, the auxiliary winding 403 of the rotor 400 being poled for the reverse starting by virtue of the cooperation between the stationary contacts 425 and 426 and the respectively engaged reverse contacts 455 and 456. Subsequently when the drum controller 410 is returned from its reverse position back into its off position, the stationary contacts 427 and 428 respectively engage the off contacts 437 and 438 during a short arc of the return movement, while the stationary contacts 421 and 426, inclusive, respectively engage the reverse contacts 451 to 456, inclusive. Accordingly, the auxiliary winding 403 is short-circuited during this short time interval while the main winding 402 is energized; whereby the rotor 404 is dynamically braked, the rotation thereof being arrested substantially instantly. The path for short-circuiting the auxiliary winding 403 and the multiple path for short-circuiting the secondary winding 409 are the same as described above; and the braking rate of the rotor 404 again depends upon the position of the control switch 460.

In conjunction with the control circuit of Fig. 4, it is noted that the reverse poling of the auxiliary winding 403 with respect to the secondary winding 409 is achieved by reversing the terminals of the auxiliary winding 403, but that alternatively this effect may be obtained by reversing the terminals of the secondary winding 409.

In view of the above description, it will be understood that the drum controller 410 may be quickly operated from either of its extreme positions through its off position into the other of its extreme positions so as to effect reversal of the direction of rotation of the rotor 404 with dynamic braking therebetween; whereby the drum controller 410 may be quickly or instantly operated between its extreme positions without any danger of damage to the motor 400 and so as to obtain the required reversal of the direction of rotation of the rotor 404.

In connection with the drum controllers 310 and 410 in the respective control circuits of Figs. 3 and 4, it is pointed out that it is conventional to bias such a drum controller by means, not shown, into its off position, and to provide restraining means, not shown, to retain the same in each of its forward and reverse positions; and in the drum controllers 310 and 410 such facilities may be incorporated if desired.

In view of the foregoing, it is apparent that there has been provided improved starting-running control circuits for induction motors of the single-phase split-phase capacitor type that insure ready starting and running of the rotors in either direction, as well as improved starting-running-braking control circuits for such motors that further insure positive reversal of the direction of rotation of the rotors and dynamic braking therebetween incident to operation of the associated circuit controllers between their corresponding forward and reverse positions.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a control circuit including an induction motor provided with a stator having angularly displaced main and auxiliary windings and a reversible rotor having a squirrel-cage winding, a transformer provided with a core having primary and secondary windings, a capacitor, and a source of single-phase alternating current supply; the combination comprising a control switch having an off position and forward and reverse positions respectively disposed on opposite sides of said off position, means for selectively operating said switch between its different positions, a first circuit for energizing said main winding and said primary winding in series relation across said source, said switch in its off position interrupting said first circuit and in either its forward position or its reverse position completing said first circuit, a second circuit for connecting said auxiliary winding and said secondary winding and said capacitor in series relation, and means controlled by operation of said switch between its forward and reverse positions for reversing the relative polarity between one of said transformer windings and one of said motor windings in the corresponding one of said circuits so that said rotor starts and runs in the forward direction when said switch is operated into its forward position and so that said rotor starts and runs in the reverse direction when said switch is operated into its reverse position.

2. In a control circuit including an induction motor provided with a stator having angularly displaced main and auxiliary windings and a reversible rotor having a squirrel-cage winding, a transformer provided with a core having primary and secondary windings, a capacitor, and a source of single-phase alternating current supply; the combination comprising a control switch having an off position and forward and reverse positions respectively disposed on opposite sides of said off position, means for selectively operating said switch between its different positions, a first circuit for energizing said main winding and said primary winding in series relation across said source, said switch in its off position interrupting said first circuit and in either its forward position or its reverse position completing said first circuit, a second circuit for connecting said auxiliary winding and said secondary winding and said capacitor in series relation, and means controlled by operation of said switch between its forward and reverse positions for reversing the relative polarity between said primary winding and said main winding in said first circuit so that said rotor starts and runs in the forward direction when said switch is operated into its forward position and so that said rotor starts and runs in the reverse direction when said switch is operated into its reverse position.

3. In a control circuit including an induction motor provided with a stator having angularly displaced main and auxiliary windings and a reversible rotor having a squirrel-cage winding, a transformer provided with a core having primary and secondary windings, a capacitor, and a source of single-phase alternating current supply; the combination comprising a control switch having an off position and forward and reverse positions respectively disposed on opposite sides of said off position, means for selectively operating said switch between its different positions, a first circuit for energizing said main winding and said primary winding in series relation across said source, said switch in its off position interrupting said first circuit and in either its forward position or its reverse position completing said first circuit, a second circuit for connecting said auxiliary winding and said secondary winding and said capacitor in series relation, and means controlled by operation of said switch between its forward and reverse positions for reversing the relative polarity between said secondary winding and said auxiliary winding in said second circuit so that said rotor starts and runs in the forward direction when said switch is operated into its forward position and so that said rotor starts and runs in the reverse direction when said switch is operated into its reverse position.

4. In a control circuit including an induction motor provided with a stator having angularly displaced main and auxiliary windings and a reversible rotor having a squirrel-cage winding, a transformer provided with a core having primary and secondary windings, a capacitor, and a source of single-phase alternating current supply; the combination comprising a control switch having an off position and forward and reverse positions respectively disposed on opposite sides of said off position, means for selectively operating said switch between its different positions, a first circuit for energizing said main winding and said primary winding in series relation across said source, a second circuit for connecting said auxiliary winding and said secondary winding and said capacitor in series relation, means controlled by operation of said switch from its off position into its forward position for establishing a forward polarity between one of said transformer windings and one of said motor windings in the corresponding one of said circuits to condition said rotor for forward starting and controlled by operation of said switch from its off position into its reverse position for establishing a reverse polarity between said one transformer winding and said one motor winding in said one circuit to condition said rotor for reverse starting, means controlled by operation of said switch from its off position into either its forward position or its reverse position for completing said first circuit so as to effect corresponding starting and running of said rotor, a path for short-circuiting said auxiliary winding, means controlled by operation of said switch from either its forward position or its reverse position back into its off position for completing said path and then for interrupting said first circuit in order to effect dynamic braking of said rotor, and additional means controlled by operation of said switch from its off position into either its forward position or its reverse position for interrupting said path.

5. The control circuit combination set forth in claim 4, wherein said one transformer winding is said primary winding and said one motor winding is said main winding and said one circuit is said first circuit.

6. The control circuit combination set forth in claim 4, wherein said one transformer winding is said secondary winding and said one motor winding is said auxiliary winding and said one circuit is said second circuit.

7. The control circuit combination set forth in claim 4, wherein said dynamic braking of said rotor instantly arrests rotation thereof so as to prevent overrun of said rotor when said switch is instantly operated from either its forward position or its reverse position back into its off position.

8. The control circuit combination set forth in claim 4, wherein said dynamic braking of said rotor instantly arrests rotation thereof so that said controller may be instantly operated between its forward position and its reverse position through its off position to effect corresponding instant reversal of the direction of rotation of said rotor.

9. The control circuit combination set forth in claim 4, wherein said path for short-circuiting said auxiliary winding includes at least a portion of said capacitor.

10. The control circuit combination set forth in claim 4, and further comprising a device selectively operative to include and to exclude a portion of said capacitor with respect to said path for short-circuiting said auxiliary winding.

11. The control circuit combination set forth in claim 4, wherein said switch is essentially in the form of a rotary drum-controller.

12. The control circuit combination set forth in claim 1, wherein said capacitor is of the dry electrolytic type.

13. The control circuit combination set forth in claim 1, wherein said transformer core is of the saturable type so that it is respectively saturated and unsaturated during starting and running of said rotor in either direction.

14. The control circuit combination set forth in claim 13, wherein said second circuit is at a near series-resonant condition during saturation of said transformer core.

No references cited.